United States Patent
Georgin et al.

(10) Patent No.: US 12,194,974 B2
(45) Date of Patent: Jan. 14, 2025

(54) SYSTEMS AND METHODS FOR PRESSURE CONTROL MIXED MODE FOR BRAKING OPERATION

(71) Applicant: GOODRICH CORPORATION, Charlotte, NC (US)

(72) Inventors: Marc Georgin, Dayton, OH (US); Philip Hill, Urbana, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 713 days.

(21) Appl. No.: 17/345,874

(22) Filed: Jun. 11, 2021

(65) Prior Publication Data
US 2022/0055600 A1    Feb. 24, 2022

Related U.S. Application Data

(60) Provisional application No. 63/068,239, filed on Aug. 20, 2020.

(51) Int. Cl.
    *B60T 17/22*      (2006.01)
    *B60T 8/17*      (2006.01)
    (Continued)

(52) U.S. Cl.
    CPC .......... *B60T 17/221* (2013.01); *B60T 8/1703* (2013.01); *B60T 15/028* (2013.01); *B64C 25/44* (2013.01); *B60T 8/325* (2013.01)

(58) Field of Classification Search
    CPC ...... B60T 17/221; B60T 8/1703; B60T 8/325; B60T 15/028; B60T 13/662; B60T 2270/88; B64C 25/44
See application file for complete search history.

(56) References Cited

U.S. PATENT DOCUMENTS

| | | | |
|---|---|---|---|
| 3,926,479 A | | 12/1975 | Bissell et al. |
| 4,367,529 A | * | 1/1983 | Masclet ................ B60T 13/662 |
| | | | 701/79 |

(Continued)

FOREIGN PATENT DOCUMENTS

| | | | | |
|---|---|---|---|---|
| CN | 111792025 A | * | 10/2020 | ............ B60T 13/662 |
| EP | 1444120 | | 8/2004 | |

(Continued)

OTHER PUBLICATIONS

European Patent Office, European Search Report dated Feb. 21, 2024 in Application No. 23198355.2.

(Continued)

*Primary Examiner* — Vishal R Sahni
(74) *Attorney, Agent, or Firm* — SNELL & WILMER L.L.P.

(57) ABSTRACT

A brake control system of the present disclosure calibrates a servo valve and calculates a calibrated transfer function associated with the servo valve for precise braking in open-loop mode. The calibration steps may include determining i) whether an aircraft is on a ground surface, ii) whether the aircraft is not moving relative to the ground surface, and iii) whether braking is applied to a brake system of the aircraft. The brake control unit may calibrate the servo valve in response to the brake control unit determining that i) the aircraft is on the ground surface, ii) the aircraft is not moving relative to the ground surface, and iii) the braking is not applied to the brake system of the aircraft. The calibration process includes sending two or more test currents to the servo valve, and determining braking pressures associated with those test currents to calculate the transfer function.

13 Claims, 10 Drawing Sheets

(51) Int. Cl.
*B60T 15/02* (2006.01)
*B64C 25/44* (2006.01)
*B60T 8/32* (2006.01)

(56) References Cited

U.S. PATENT DOCUMENTS

| | | | |
|---|---|---|---|
| 10,131,421 B2 | 11/2018 | Georgin et al. | |
| 10,293,796 B2 | 5/2019 | Georgin | |
| 2010/0090058 A1 | 4/2010 | Cahill et al. | |
| 2010/0292889 A1* | 11/2010 | Cahill | B60T 8/885 |
| | | | 701/29.1 |
| 2015/0127195 A1 | 5/2015 | Cahill | |
| 2015/0344017 A1* | 12/2015 | Cahill | B60T 17/221 |
| | | | 701/3 |
| 2017/0174201 A1* | 6/2017 | Georgin | B60T 13/74 |
| 2018/0015911 A1 | 1/2018 | Georgin | |
| 2018/0155014 A1 | 6/2018 | Cahill et al. | |
| 2018/0162331 A1* | 6/2018 | Ayichew | B60T 7/16 |
| 2019/0193704 A1 | 6/2019 | Zell et al. | |
| 2019/0193708 A1* | 6/2019 | Kordik | B60T 17/22 |
| 2020/0101952 A1 | 4/2020 | Mastrocola et al. | |

FOREIGN PATENT DOCUMENTS

| | | | | |
|---|---|---|---|---|
| EP | 3501927 A1 | * | 6/2019 | ............ B60T 17/22 |
| GB | 2470251 A | * | 11/2010 | ............ B60T 8/1703 |
| GB | 2588383 A | * | 4/2021 | ............ B60T 17/222 |
| KR | 20090132703 A | * | 6/2008 | |

OTHER PUBLICATIONS

European Patent Office; European Partial Search Report dated Mar. 15, 2022 in Application No. 21192348.7.
European Patent Office; European Search Report dated Jun. 15, 2022 in Application No. 21192348.7.

* cited by examiner

SYSTEMS AND METHODS FOR PRESSURE CONTROL MIXED MODE FOR BRAKING OPERATION

CROSS REFERENCE TO RELATED APPLICATIONS

This application claims priority to, and the benefit of, U.S. Provisional Patent Application Ser. No. 63/068,239, entitled "SYSTEMS AND METHODS FOR PRESSURE CONTROL MIXED MODE FOR BRAKING OPERATION," filed on Aug. 20, 2020. The '239 Application is hereby incorporated by reference in its entirety for all purposes.

FIELD

In general, the arrangements disclosed herein relate to braking systems and methods. More specifically, they relate to systems and methods for brake control suitable for use in aircraft.

BACKGROUND

A servo valve is used in brake control systems to vary hydraulic power to braking systems (e.g., a brake actuator) to control brake pressures and aircraft deceleration. The servo valve may receive an electric current for varying the hydraulic pressure supplied to the braking systems. Typical braking systems operate in a closed-loop mode and utilize pressure feedback signals for adjusting the electric current supplied to the servo valve to maintain the braking pressure at the commanded pressure.

SUMMARY

A brake control system is disclosed, comprising a servo valve configured to receive a hydraulic fluid and provide the hydraulic fluid to apply a braking force to a wheel via a hydraulic line, and a brake control unit in electronic communication with the servo valve. The brake control unit is configured to determine whether an aircraft is on a ground surface and not moving relative to the ground surface, determine whether braking is applied to a brake system of the aircraft, and calibrate the servo valve in response to the brake control unit determining that i) the aircraft is on the ground surface, ii) the aircraft is not moving relative to the ground surface, and iii) the braking is not applied to the brake system of the aircraft.

In various embodiments, the calibrating comprises sending, by the brake control unit, a first electric current to the servo valve, and determining, by the brake control unit, a first pressure applied to the brake system via the servo valve, in response to the first electric current being sent to the servo valve.

In various embodiments, the calibrating further comprises sending, by the brake control unit, a second electric current to the servo valve, and determining, by the brake control unit, a second pressure applied to the brake system via the servo valve, in response to the second electric current being sent to the servo valve.

In various embodiments, the calibrating further comprises calculating, by the brake control unit, a braking pressure versus servo valve current curve based upon the first electric current, the first pressure, the second electric current, and the second pressure.

In various embodiments, the calibrating further comprises calculating, by the brake control unit, a transfer function associated with the servo valve using the first electric current, the first pressure, the second electric current, and the second pressure.

In various embodiments, the second electric current is sent to the servo valve for a predetermined duration, and the second pressure is an average pressure measured during the predetermined duration.

In various embodiments, the brake control unit is further configured to determine whether the calibration of the servo valve was successful, operate as an open-loop system in response to the calibration being successful, and operate as a closed-loop system in response to the calibration being unsuccessful.

A method for operating a brake control unit is disclosed, comprising initiating, by the brake control unit, a servo valve calibration process, determining, by the brake control unit, whether an aircraft is on a ground surface and not moving relative to the ground surface, determining, by the brake control unit, whether braking is applied to a brake system of the aircraft, and calibrating, by the brake control unit, a servo valve in response to the brake control unit determining that the aircraft is on the ground surface and not moving relative to the ground surface, and that braking is not applied to the brake system of the aircraft.

In various embodiments, the calibrating comprises sending, by the brake control unit, a first electric current to the servo valve, and determining, by the brake control unit, a first pressure applied to the brake system via the servo valve, in response to the first electric current being sent to the servo valve.

In various embodiments, the calibrating further comprises sending, by the brake control unit, a second electric current to the servo valve, and determining, by the brake control unit, a second pressure applied to the brake system via the servo valve, in response to the second electric current being sent to the servo valve.

In various embodiments, the calibrating further comprises calculating, by the brake control unit, a braking pressure versus servo valve current curve based upon the first electric current, the first pressure, the second electric current, and the second pressure.

In various embodiments, the calibrating further comprises calculating, by the brake control unit, a transfer function associated with the servo valve using the first electric current, the first pressure, the second electric current, and the second pressure.

In various embodiments, the second electric current is sent to the servo valve for a predetermined duration, and the second pressure is an average pressure measured during the predetermined duration.

In various embodiments, method further comprises determining, by the brake control unit, whether the calibration of the servo valve was successful, commanding, by the brake control unit, braking in an open-loop fashion in response to the calibration being successful, and commanding, by the brake control unit, braking in a closed-loop fashion in response to the calibration being unsuccessful.

A brake control system is disclosed, comprising a servo valve configured to receive a hydraulic fluid and provide the hydraulic fluid to apply braking force to a wheel via a hydraulic line, and a brake control unit in electronic communication with the servo valve. The brake control unit is configured to calibrate the servo valve, determine whether a calibration of the servo valve was successful, in response to the calibration of the servo valve being successful, operate the servo valve in an open-loop system, and in response to the calibration of the servo valve being unsuccessful, operate the servo valve in a closed-loop system.

In various embodiments, the calibrating comprises sending, by the brake control unit, a first electric current to the servo valve, and determining, by the brake control unit, a first pressure applied to the brake system via the servo valve, in response to the first electric current being sent to the servo valve.

In various embodiments, the calibrating further comprises sending, by the brake control unit, a second electric current to the servo valve, and determining, by the brake control unit, a second pressure applied to the brake system via the servo valve, in response to the second electric current being sent to the servo valve.

In various embodiments, the calibrating further comprises calculating, by the brake control unit, a braking pressure versus servo valve current curve based upon the first electric current, the first pressure, the second electric current, and the second pressure.

In various embodiments, the brake control unit utilizes a pressure feedback signal in response to operating in the closed-loop system.

In various embodiments, the brake control unit utilizes a braking pressure versus servo valve current curve generated during the calibration, in response to operating in the open-loop system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems, methods, and devices for brake control, such as within a braking system of an aircraft. While numerous details are included herein pertaining to aircraft components, such as brake components, the systems and methods disclosed herein can be applied to other systems with other servo valves and the like.

As used herein, the term "weight-on-wheels (WOW) condition" means that at least a portion of the aircraft is supported on the ground via the landing gear with the associated tire in contact with a ground surface.

A brake control system, as disclosed herein, may calibrate a servo valve to generate a transfer function for calculating a servo valve command current for precise pressure control in an open-loop system. The servo valve may be calibrated often, such as before each flight and/or at the beginning of each brake control unit power up. Brake control systems of the present disclosure may command braking in an open-loop system and eliminate undesirable pressure oscillations associated with typical closed-loop pressure control feedback systems. Furthermore, brake control systems of the present disclosure provide methods for operating as an open-loop system utilizing the calculated transfer function, or as a closed-loop system in the event of an unsuccessful servo valve calibration.

Brake control systems of the present disclosure may comprise a pressure control mixed mode of operation which provides additional capability to pressure control by recalibrating the servo valve characteristics at predetermined intervals, such as at every brake control unit power up. This calibration data may determine a transfer function that is used to apply pressure without pressure feedback interaction from the controls which may keep the pressure response stable, provide consistent pressure response, and/or avoid erroneous fault detection in brake control module line replaceable units (LRUs). In addition, systems and methods of the present disclosure may relieve manufacturing tolerances and ultimately lead to better manufacturing yield, on time delivery, and a lower cost for the brake control module LRUs.

Figure 1A:
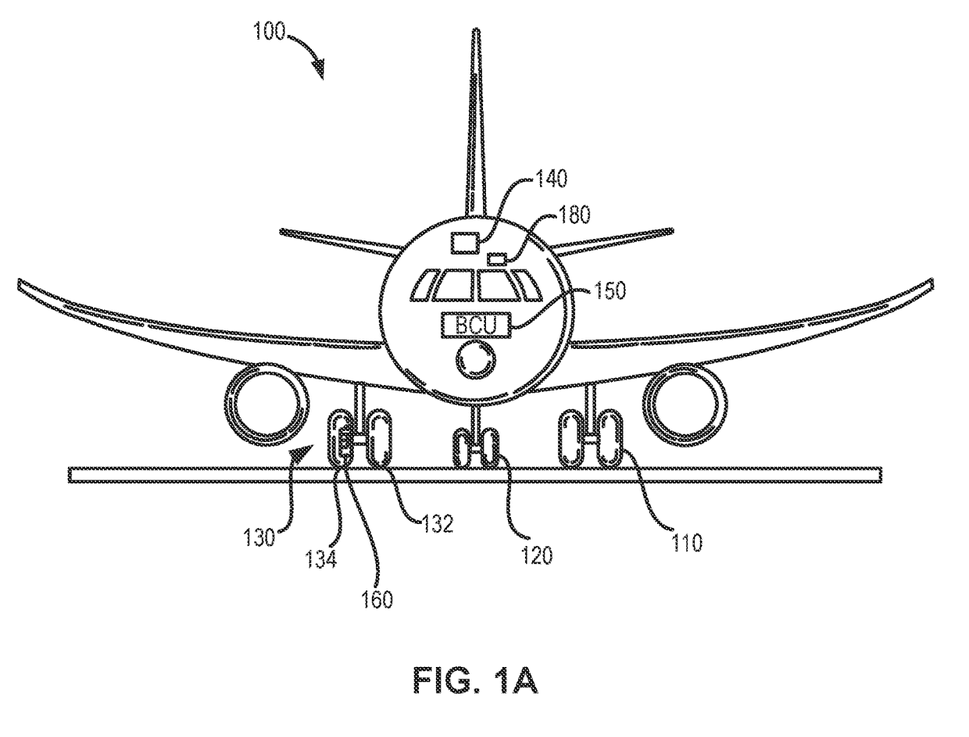
FIG. 1A illustrates an aircraft having multiple landing gear and brakes, in accordance with various embodiments.

Referring now to FIG. 1A, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. With brief reference now to FIG. 1B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like. The BCU 150 may further include hardware 158 capable of performing various logic using discreet power signals received from various aircraft systems.

Referring again more particularly to FIG. 1A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Figure 1B:
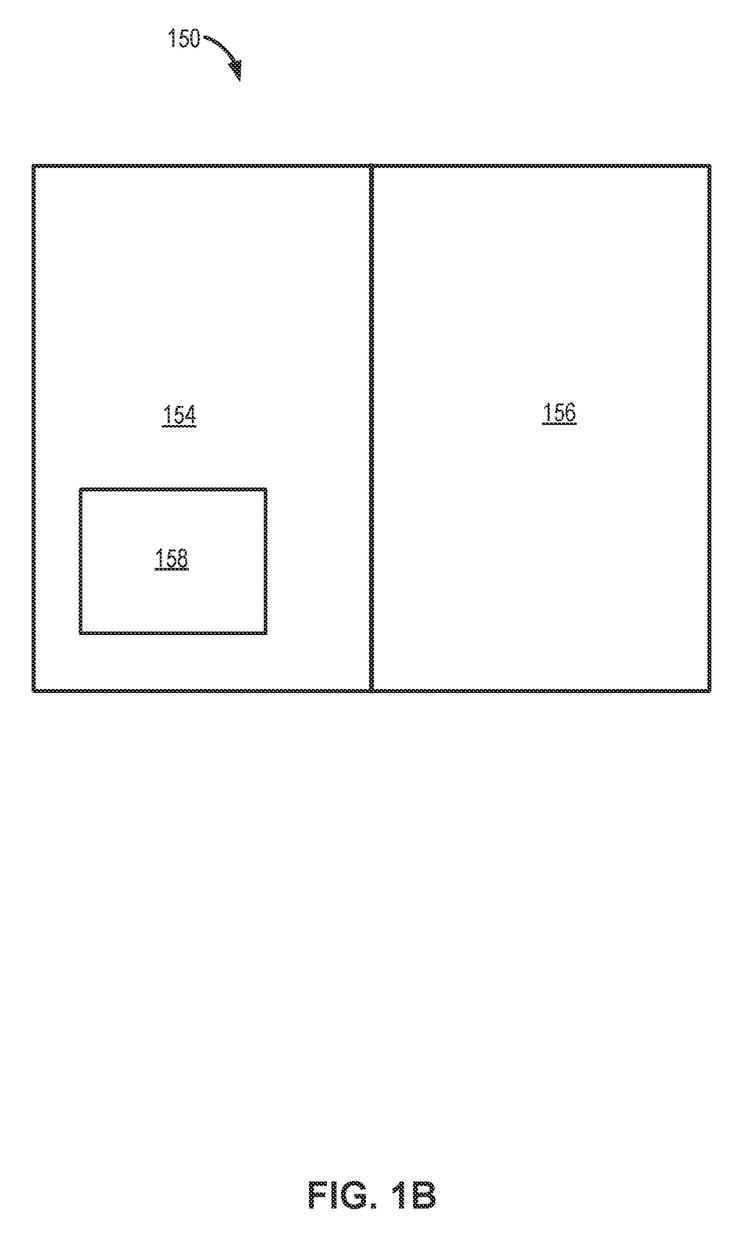
FIG. 1B is a block diagram of a brake control unit of the aircraft of FIG. 1A, in accordance with various embodiments.
Figure 1C:
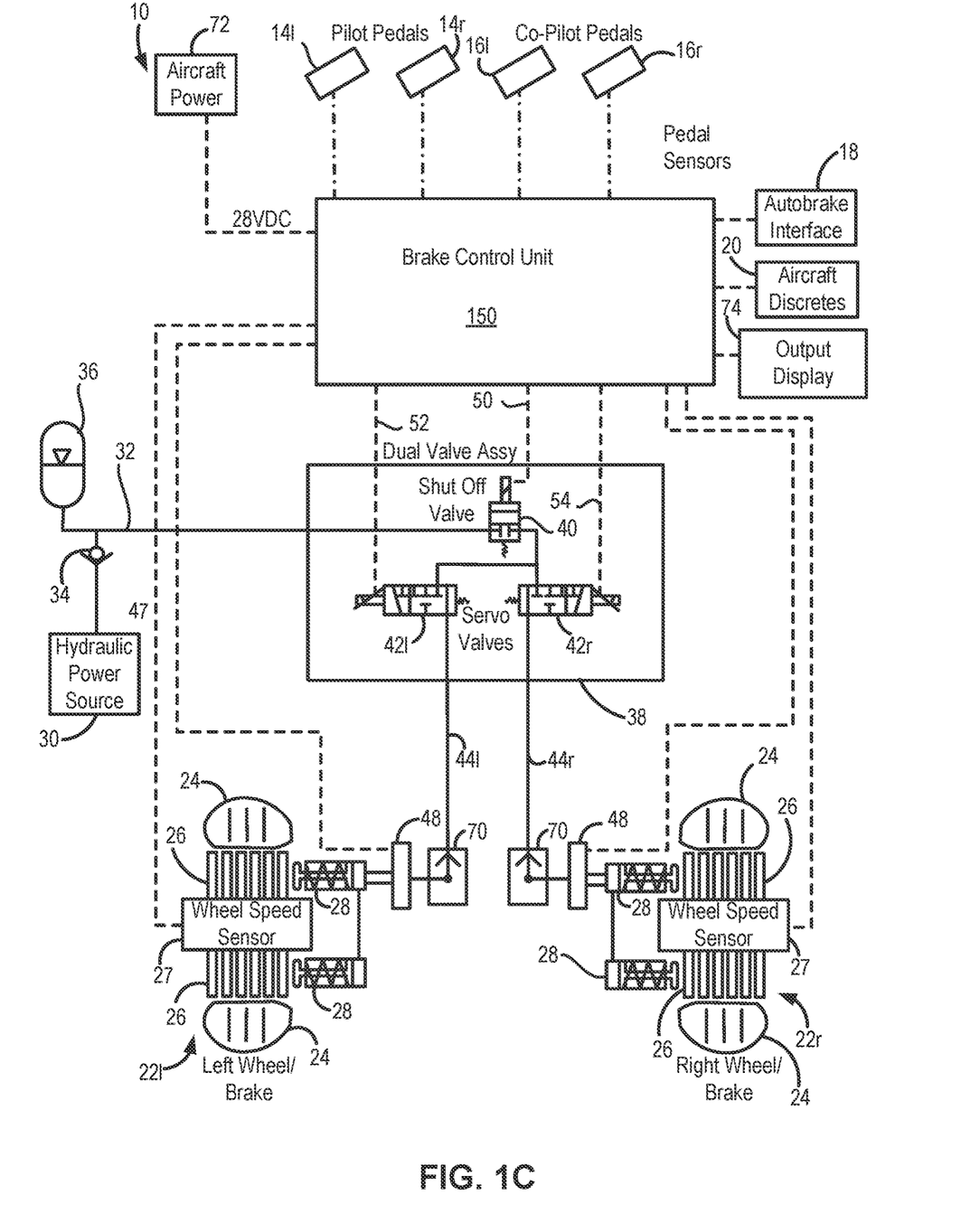
FIG. 1C is a functional diagram of a braking system of the aircraft of FIG. 1A, in accordance with various embodiments.

Referring now also to FIG. 1C, including with continued reference to FIGS. 1A and 1B as well, a braking system 10 is shown in accordance with an embodiment of the inventive arrangements. The braking system 10 includes the brake control unit (BCU) 150 of FIGS. 1A and 1B, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

As described herein, the braking system generally includes, inter alia, a hydraulic power source 30 acting through i) a left wheel servo valve 42*l* to apply hydraulic pressure through a left hydraulic line 44*l* and shuttle valve 70 to apply a braking force to actuators 28 of a left wheel/brake assembly 22*l*; and ii) a right wheel servo valve 42*r* to apply hydraulic pressure through a right hydraulic line 44*r* and shuttle valve 70 to apply a braking force to actuators 28 of a right wheel/brake assembly 22*r*. First pressure sensors 48 may be intermediate, and in fluid communication with, the actuators 28 and shuttle valves 70 of the left wheel/brake assembly 22*l* and right wheel/brake assembly 22*r*.

In various embodiments, the shuttle valves 70, first pressure sensors 48, and actuators 28 may be common to both a primary braking system and a non-primary braking system of the braking system 10 of the aircraft 100.

In various embodiments of the braking system, the BCU 150 receives brake command signals from a left pilot brake pedal 14*l* and a right pilot brake pedal 14*r* and/or a left co-pilot brake pedal 16*l* and a right co-pilot brake pedal 16*r*. The brake command signals from the left pilot brake pedal 14*l* and the right pilot brake pedal 14*r* and/or the left co-pilot brake pedal 16*l* and the right co-pilot brake pedal 16*r* are indicative of a desired amount of braking. In various embodiments, the left pilot brake pedal 14*l* may provide a brake command signal to the BCU 150 that is indicative of a degree of travel of the left pilot brake pedal 14*l*, and thus the amount of desired braking by the left wheel/brake assembly 22*l*. Similarly, the remaining right pilot brake pedal 14*r*, the left co-pilot brake pedal 16*l*, and the right co-pilot brake pedal 16*r* each provide a brake command signal to the BCU 150 that is indicative of a degree of travel of the right pilot brake pedal 14*r*, the left co-pilot brake pedal 16*l*, and the right co-pilot brake pedal 16*r*, respectively, and thus the amount of desired braking by the left wheel/brake assembly 22*l* or right wheel/brake assembly 22*r*. In various embodiments, each brake pedal may have a corresponding transducer respectively serving the BCU 150 to provide the brake command signal to the BCU 150. However, any suitable brake pedal configuration is within the scope of the present disclosure.

In addition, the BCU 150 receives control signals from an auto-brake interface 18 for performing auto-brake and rejected take-off (RTO) braking functions. The BCU 150 also receives a series of discrete control signals associated with the aircraft 100, such as engine parameters, aircraft temperatures, or aircraft pressures for example, generally represented as aircraft discretes 20, for providing braking control thereof.

In various embodiments, the BCU 150 controls braking of the left wheel/brake assembly 22*l* and the right wheel/brake assembly 22*r*, as noted above. The left wheel/brake assembly 22*l* includes one or more wheels 24 and brake stacks 26. A plurality of actuators 28 may be provided for exerting braking forces on the brake stacks 26 in order to brake the wheels 24. The right wheel/brake assembly 22*r* has a similar, mirrored configuration. Both the left wheel/brake assembly 22*l* and the right wheel/brake assembly 22*r* also include, in various embodiments, wheel speed sensors 27 that provide wheel speed information to the BCU 150 for carrying out brake control operations.

In various embodiments of the braking system, a hydraulic power source 30 serves as a primary brake power supply within the braking system 10. In various embodiments, a primary hydraulic line 32 from the hydraulic power source 30 includes a check valve 34 and an accumulator 36. In various embodiments, the primary hydraulic line 32 is input into a brake control module (BCM) 38 included within the braking system 10. The BCM 38 includes a shutoff valve 40 through which the primary hydraulic line 32 supplies hydraulic fluid to the left wheel servo valve 42l and the right wheel servo valve 42r. However, separate BCMs may be provided for individually supplying hydraulic fluid to the left wheel servo valve 42l and the right wheel servo valve 42r without departing from the spirit and scope of the present disclosure. In various embodiments, hydraulic fluid from the left wheel servo valve 42l and the right wheel servo valve 42r is respectively provided through a left hydraulic line 44l and a right hydraulic line 44r to apply the braking force to the wheels 24 during a braking operation.

During primary braking operations, hydraulic fluid pressure through the left hydraulic line 44l and the right hydraulic line 44r respectively passes to the corresponding actuators 28 via one or more of the corresponding shuttle valves 70. Thus, if the braking system 10 is functioning in the primary braking mode, the shutoff valve 40 is open to the left hydraulic line 44l and the right hydraulic line 44r, and the BCU 150 controls the amount of hydraulic pressure that is delivered to the wheels 24 respectively via the left wheel servo valve 42l and the right wheel servo valve 42r acting through the corresponding left hydraulic line 44l and right hydraulic line 44r.

In various embodiments, the shutoff valve 40, the left wheel servo valve 42l, and the right wheel servo valve 42r are coil valves. In various embodiments, the shutoff valve 40 receives a shutoff valve control signal on a bus 50 from the BCU 150. Similarly, the left wheel servo valve 42l may receive a servo valve control signal on a bus 52 from the BCU 150. Likewise, the right wheel servo valve 42r may receive a servo valve control signal on a bus 54 from the BCU 150. The servo valve control signal may comprise an electric current signal. Stated differently, electric current supplied to left wheel servo valve 42l and/or right wheel servo valve 42r may be varied to adjust braking pressure applied at the brake stacks 26 via actuators 28.

In various embodiments, the braking system 10 includes first pressure sensors 48 for monitoring the hydraulic pressure in the left hydraulic line 44l and the right hydraulic line 44r and providing such information back to the BCU 150. In addition, power to the BCU 150 is provided from an aircraft power source 72, such as a DC power source within the aircraft 100. In various embodiments, power is transmitted from the aircraft power source 72 to the BCU 150.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the health status of the braking system 10, including the various components thereof.

In various embodiments, the braking system 10 may be activated by the left pilot brake pedal 14l, the right pilot brake pedal 14r, the left co-pilot brake pedal 16l, and the right co-pilot brake pedal 16r respectively acting through the shutoff valve 40, the left wheel servo valve 42l, the right wheel servo valve 42r, the left hydraulic line 44l, and the right hydraulic line 44r.

The braking system 10 utilizes the shutoff valve 40 in-line with the left wheel servo valve 42l and the right wheel servo valve 42r to provide a level of redundancy that ensures a single valve failure cannot cause inadvertent braking. In order for the braking force to be applied by the braking system 10 to the left wheel/brake assembly 22l and the right wheel/brake assembly 22r, the shutoff valve 40 must be open along with at least one of the left wheel servo valve 42l and the right wheel servo valve 42r. To provide a redundancy so that the brakes can be operated when commanded, each of the valves (shutoff and servo) may contain dual control coils with one coil for different dedicated channels in the BCU 150, in accordance with various embodiments.

Figure 2:
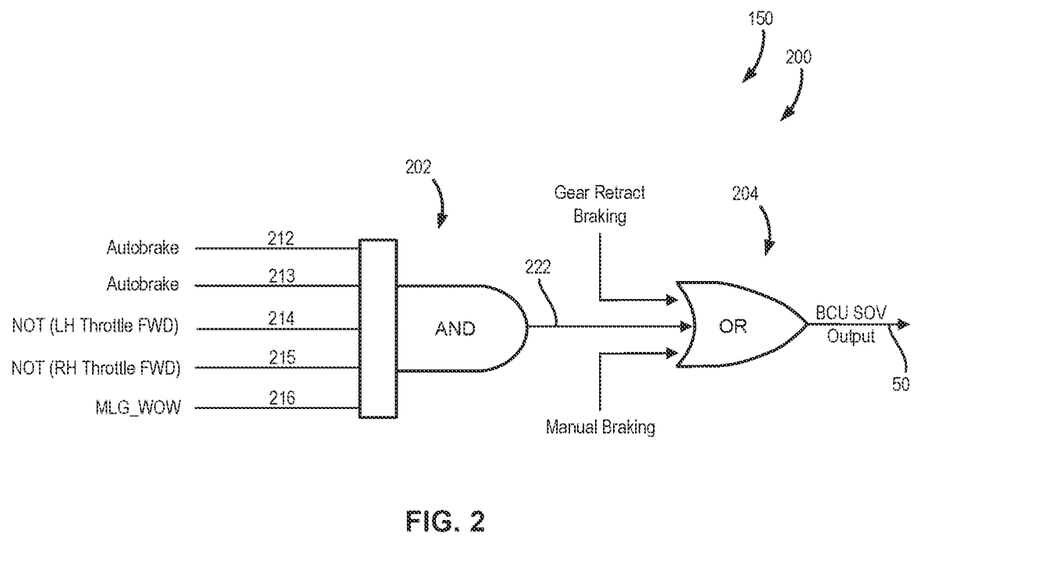
FIG. 2 is a schematic view of an autobrake initialization logic for a brake control unit, in accordance with various embodiments.

Referring now to FIG. 2, and also to FIG. 1C, an autobrake initialization system 200 for BCU 150 for controlling shutoff valve 40 is illustrated, in accordance with various embodiments. Autobrake initialization system 200 may include an AND gate 202 configured to receive a plurality of signals for indicating that an aircraft is in a desirable condition for braking. AND gate 202 may output a shutoff valve signal 222 in response to all of the signals being true (e.g., in response to receiving power from all of the signals) for opening shutoff valve 40. AND gate 202 may receive a first autobrake signal 212. First autobrake signal 212 may be sent in response to a signal from an operator of the aircraft (e.g., a pilot may actuate a switch in the cockpit) which indicates that autobraking is desired. AND gate 202 may receive a second autobrake signal 213. Second autobrake signal 213 may be sent in response to a signal from an operator of the aircraft (e.g., a pilot may actuate a switch in the cockpit) which indicates that autobraking is desired. AND gate 202 may receive a left hand (LH) throttle signal 214. LH throttle signal 214 may be sent in response to a throttle position of a left hand engine being set below a predetermined position (e.g., at idle). For example, AND gate 202 may receive LH throttle signal 214 from an avionics unit or other on-board controller which monitors the throttle position of the aircraft engines. AND gate 202 may receive a right hand (RH) throttle signal 215. RH throttle signal 215 may be sent in response to a throttle position of a right hand engine being set below a predetermined position (e.g., at idle). AND gate 202 may receive a main landing gear (MLG) weight-on-wheel (WOW) signal 216. MLG WOW signal 216 may be sent in response to an aircraft's main landing gear touching down onto a ground surface. In various embodiments, the MLG WOW signal 216 is sent in response to an aircraft's main landing gear touching down onto a ground surface for a predetermined amount of time, to ensure that the main landing gear is not bouncing on the ground surface during braking for example. AND gate 202 may receive MLG WOW signal 216 from an avionics unit or other on-board controller which monitors the landing gear position (e.g., whether the shock strut is compressed) and/or which monitors the rotational velocity of the aircraft wheels. For example, a compressed shock strut may indicate that the main landing gear has touched the ground surface and is partially supporting the aircraft. Furthermore, a rotational velocity of a wheel may indicate that the wheel is rotating against the ground surface. However, any system and/or method of determining that a main landing gear is under a WOW condition is within the scope of the present disclosure.

AND gate 202 may output shutoff valve signal 222 in response to all of the signals being true (e.g., in response to the autobrake signal 212 indicating that the autobrake system is powered on, in response to LH throttle signal 214 indicating that the LH engine is at or below a predetermined throttle position, in response to RH throttle signal 215 indicating that the RH engine is at or below a predetermined throttle position, and in response to the MLG WOW signal 216 indicating that the main landing gear is under a WOW condition for opening shutoff valve 40. In this manner, the aircraft brake system may be operated only under conditions where the landing gear has contacted the ground surface, the aircraft is not moving, and braking has been commanded. Although illustrated as operating through an autobrake enable logic, servo valve calibration systems and methods may be operated through other logics to determine whether the aircraft is under a WOW condition and not moving relative to a ground surface (i.e., the wheels are not spinning), without departing from the scope of the present disclosure.

In various embodiments, autobrake initialization system 200 may further include an OR gate 204 configured to receive SOV control signals from various systems. For example, OR gate 204 may receive a control signal from the autobrake system (e.g., shutoff valve signal 222), a gear retract braking control signal (e.g., to apply braking during gear retracting), and a manual braking control signal (e.g., for a pilot to manually apply braking from the cockpit). The OR gate 204 may supply a shutoff valve control signal, e.g., via bus 50, in response to receiving a control signal from any one of the autobrake, gear retract, or manual braking systems. In this manner, hydraulic pressure may be supplied to the braking system in response to any of these various braking systems being operated.

In various embodiments, AND gate 202 may comprise a hardware component. AND gate 202 may comprise one or more field-effect transistors (FETs) electronically coupled together in a known manner. AND gate 202 may provide a HIGH output (1) only if all the inputs to the AND gate 202 are HIGH (1). If none or not all inputs to the AND gate are HIGH, a LOW (0) output may result. In this regard, each signal 212, 213, 214, 215, 216 may be received by the AND gate via a plurality of electrical wires or other conductive material. Stated differently, a conductive material may be used to electronically couple AND gate 202 to the respective electronic components whereby the signals 212, 213, 214, 215, 216 are received. However, AND gate 202 may be implemented in software without departing from the scope of the present disclosure.

In various embodiments, OR gate 204 may comprise a hardware component. OR gate 204 may comprise one or more FETs electronically coupled together in a known manner. In this regard, AND gate 202 may be electronically coupled to OR gate 204 via one or more wires or other conductive material. However, OR gate 204 may be implemented in software without departing from the scope of the present disclosure.

Figure 3:
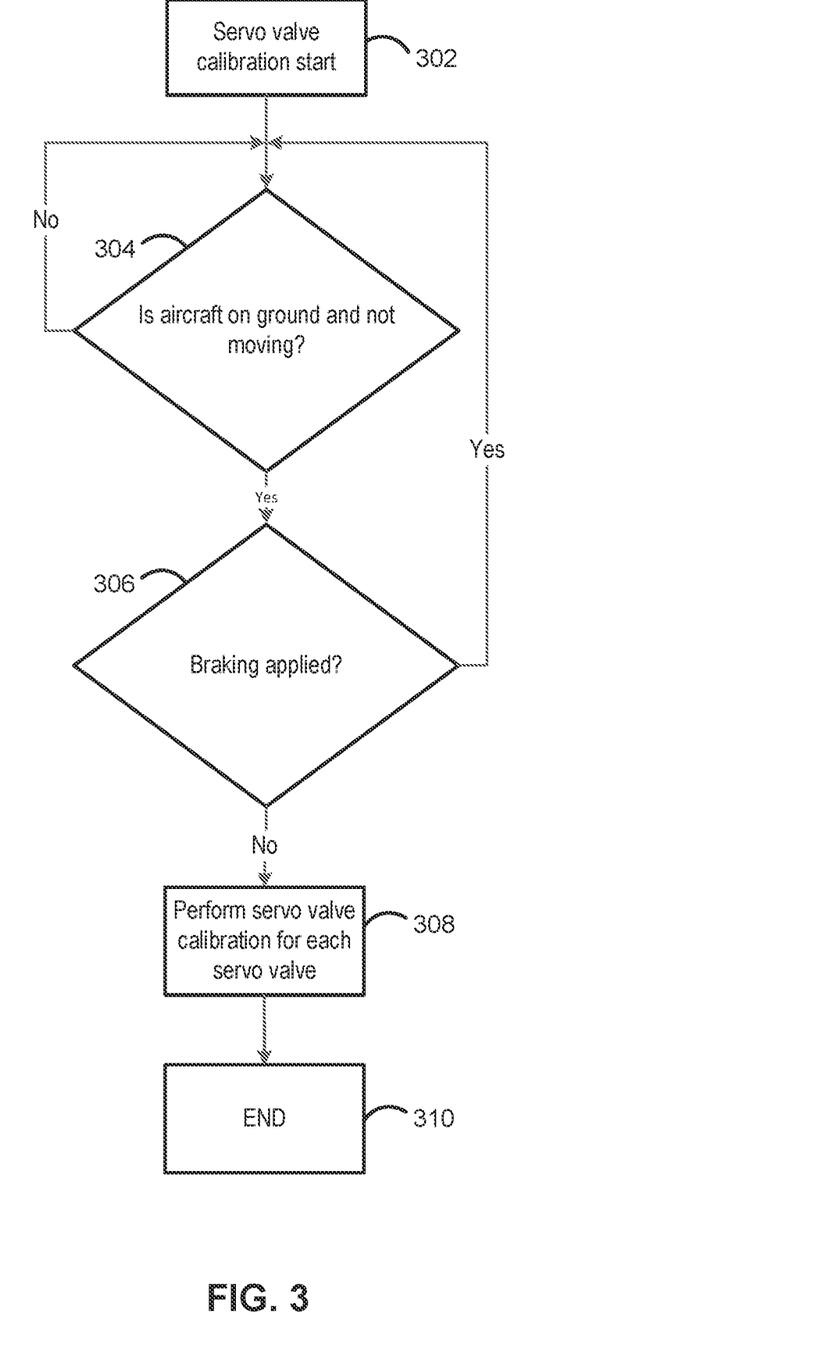
FIG. 3 is a flowchart of a method of operating a brake control unit, in accordance with various embodiments.

Referring now to FIG. 3, a method of operating a brake control unit including a servo valve calibration process is provided. More specifically, the method begins in a step 302, after which it is determined whether an aircraft is on the ground and not moving (i.e., the wheels are not spinning) at a step 304. If the aircraft is not detected to be both on the ground and not moving at step 304, then the method continues by monitoring whether the aircraft is on the ground and not moving. If the aircraft is detected to be both on the ground and not moving (e.g., at a gate of an airport or other location) at step 304, then the method continues by determining if braking is being applied at step 306. If braking is not presently being applied, then the method proceeds by performing a servo valve calibration at step 308. After the calibration is complete, the method of FIG. 3 ends at step 310.

Referring now to FIG. 1C, FIG. 2, and FIG. 3, step 302 may include activating a servo valve calibration process. In various embodiments, the servo valve calibration process may be activated by a pilot, for example by actuating a switch, lever, button, or the like in the cockpit of the aircraft. AND gate 202 may receive first autobrake signal 212 (e.g., a first electric power signal) and second autobrake signal 212 (e.g., a second electric power signal) in response to a pilot activating the autobrake system. In various embodiments, the servo valve calibration process may be activated automatically, for example upon power up of the brake control unit 150. Step 304 may include determining, by the brake control unit 150, if the aircraft is on the ground and not moving. Step 304 may include determining, by the brake control unit 150, if MLG WOW signal 216 is TRUE for a predetermined duration, such as one second for example. The predetermined duration may be any suitable duration for indicating that the landing gear is under a WOW condition and not bouncing. Step 304 may include determining, by the brake control unit 150, that the LH throttle signal 214 and the RH throttle signal 215 are both TRUE (i.e., that the engine throttle is below a predetermined threshold (e.g., at idle).

In response to the brake control unit 150 determining that the aircraft is on the ground and not moving, the servo valve calibration process may proceed to step 306. Step 306 may include determining, by the brake control unit 150, whether braking is being applied to the brake system of the aircraft. Braking may be detected based upon a pressure feedback signal of the braking system. Any suitable method for detecting whether braking is being applied is within the scope of the present disclosure.

In response to the brake control unit 150 determining that braking is not being applied to the aircraft, the servo valve calibration process may proceed to step 308. Step 308 may include performing, by the brake control unit 150, a servo valve calibration process. Said servo valve calibration process includes sending two or more current commands to each servo valve, and measuring the associated braking pressures as a result of these current commands, as described below in further detail, with reference to FIG. 4. After the servo valve calibration process is complete, the method ends at step 310.

Over its service life, a servo valves may experience performance degradation in pressure gain characteristics due to wear and tear. Particles in the brake fluid may cause silt inside the sleeve/spool assembly and degrade servo valve performance. This servo valve degradation can cause a change in static and dynamic characteristics of the servo valve which alters the performance of the servo valve, including undesired oscillations as a results of the coupling of the closed-loop controls characteristics and servo valve dynamics.

Figure 4:
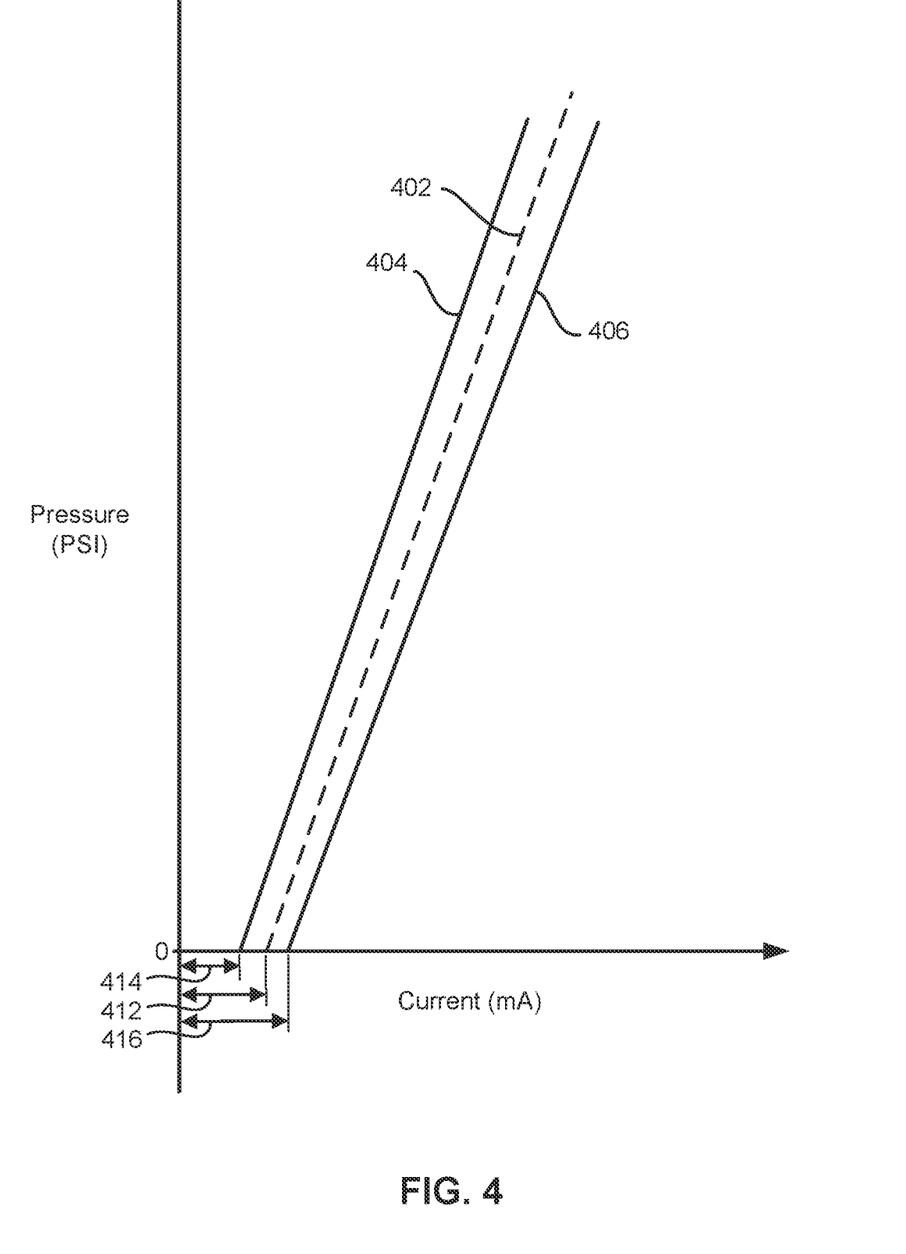
FIG. 4 illustrates braking pressure versus servo valve current curves, in accordance with various embodiments.

With reference to FIG. 4, various braking pressure versus servo valve current curves are illustrated, in accordance with various embodiments. Pressure gain can vary over the life of a servo valve. For example, while a servo valve may be expected or manufactured to operate at an expected or nominal pressure gain, illustrated by curve 402, actual pressure gains may vary, for example between a first actual pressure gain, illustrated by curve 404, and a second actual pressure gain, illustrated by curve 406. Pressure gain, as used herein, may refer to the change in pressure per unit amperage (e.g., psi/mA). Stated differently, the pressure gain may be equal to the slope of the braking pressure versus servo valve current curve. In various embodiments, nominal curve 402 may comprise a first pressure gain (e.g., 150 psi/mA). In various embodiments, curve 404 may comprise a second pressure gain (e.g., 139 psi/mA). In various embodiments, curve 406 may comprise a third pressure gain (e.g., 157 psi/mA). In this regard, actual pressure gain of a servo valve may vary over its life (e.g., between curve 404 and curve 406). Furthermore, a servo valve may comprise a dead band. As used herein, dead band may refer to a minimum amount of electric current that the servo valve can receive, before activating. For example, nominal curve 402 may comprise a first dead band 412 (e.g., 5 mA), curve 404 may comprise a second dead band 414 (e.g., 4.5 mA), and curve 406 may comprise a third dead band 416 (e.g., 7.2 mA). The dead band of a servo valve may vary due to manufacturing tolerances and may further change over the life of the servo valve.

Having introduced the braking pressure versus servo valve current curve, the servo valve calibration process is now explained in further detail. With combined reference to FIG. 1C and FIG. 4, the brake control unit 150 may first apply the autobrake command (e.g., shutoff valve signal 222 with momentary reference to FIG. 2) to request the shutoff valve 40 to open and provide pressure to the servo valves 42l, 42r. For a servo valve with a typical current range of 20 mA (e.g., 5 mA to 25 mA), the brake control unit 150 will command two or more intermediate current values to the servo valve. For example, 12 mA and 24 mA. However, these intermediate current values are provided for exemplary purposes only and the intermediate current values may vary depending on the servo valve being calibrated as well as other factors. In response to the current command being reached, the brake control unit 150 may detect the associated brake pressure value via pressure sensor 48—e.g., from a brake pressure transducer. The associated brake pressure value may be detected for a predetermined dwell time, such as three seconds for example, in accordance with various embodiments. While acquiring the brake pressure, the signal may be low pass filtered digitally by the brake control unit 150 to determine an average pressure reached during the current command. This process may be repeated any desired number of time (e.g., a first time and a second time) for each servo valve to calculate commanded pressure values associated with the commanded currents, respectively. For example, if the nominal dead band is 5 mA and the pressure gain is 150 psi/mA, then a current of 12 mA would lead to a pressure of 1050 psi (=(12-5)*150). If on the other hand, the dead band had shifted to 6.5 mA and the gain changed to 140 psi/mA, the brake pressure will be: 770 psi (=(12-6.5)*140). After the dwell time, a second current may be commanded, and the filtered pressure read from the brake pressure transducer provides the second calibration point ($i_2$, $P_2$). Having the two points ($i_1$, $P_1$) and ($i_2$, $P_2$), and relying on the servo valve response as being linear, the transfer function sought for servo valve current versus brake pressure can be established:

$$i = a \cdot P + b \quad \text{Eq. 1}$$

where:

$$a = ((i_2 - i_1))/((P_2 - P_1)) \text{ and } b = i_1 - ((i_2 - i_1))/((P_2 - P_1)) \cdot P_1 \quad \text{Eq. 2}$$

In addition to, or in place of, calculating a transfer function, systems and methods of the present disclosure may include calculating, by the brake control unit 150, a braking pressure versus servo valve current curve and storing said curve in memory, wherein the curve is called upon during braking to determine a current command associated with a desired pressure. In various embodiments, the curve is stored in memory as a lookup table or the like.

With the servo valve calibration complete, the transfer function (see at Eq. 1) for the servo valve is provided such that precise electric currents are calculated for desired braking pressures commanded via the servo valve. In this regard, with the servo valve freshly calibrated, braking may be commanded in an open-loop system which may eliminate pressure oscillations associated with typical closed-loop pressure control feedback systems.

Figure 5:
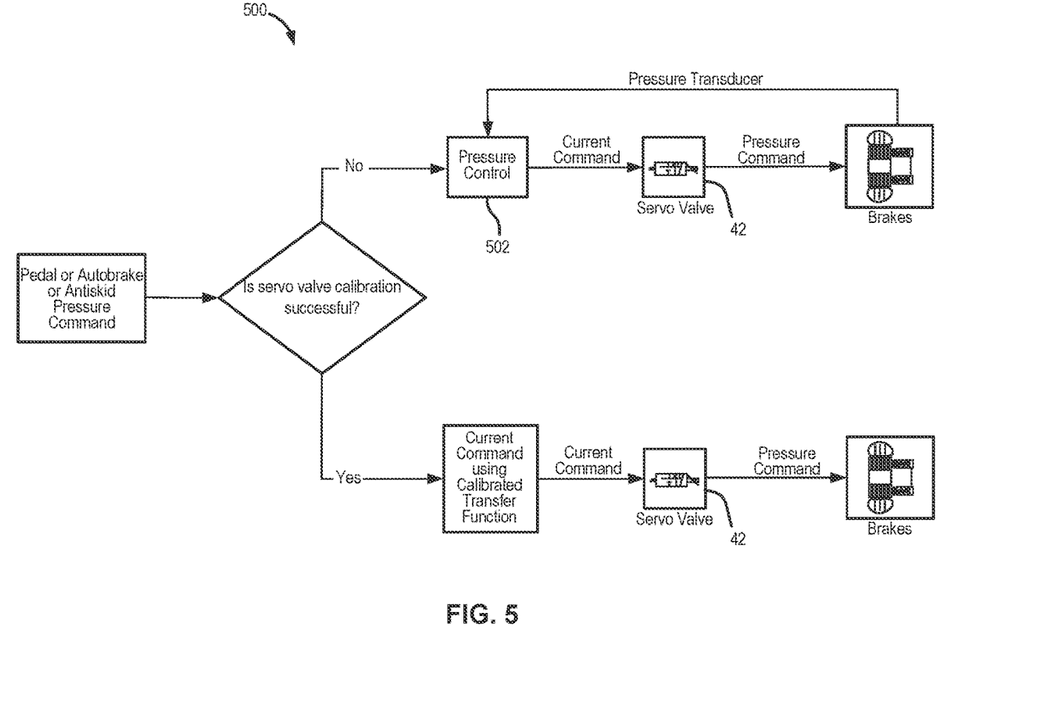
FIG. 5 illustrates a brake pressure command architecture, in accordance with various embodiments.

With reference to FIG. 5, a brake pressure command architecture 500 is illustrated, in accordance with various embodiments. Various logic in brake pressure command architecture 500 may be performed by brake control unit 150 (see FIG. 1C). In response to the servo valve calibration being successful, a pressure control 502 is bypassed and a current calculated using the calibrated transfer function is used to command the servo valve 42 for applying braking during a braking maneuver of the aircraft in an open-loop fashion. In response to the servo valve calibration being unsuccessful, the pressure control 502 is utilized and outputs the current to the servo valve 42 for applying braking during a braking maneuver of the aircraft in a closed-loop fashion (e.g., utilizing feedback from a pressure transducer).

Figure 6:
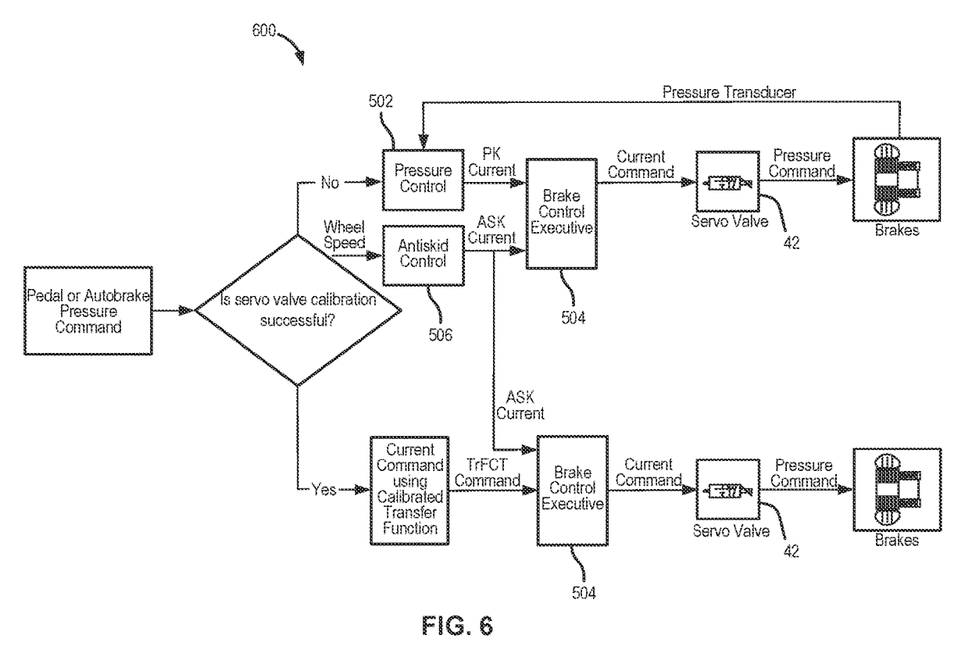
FIG. 6 illustrates a brake pressure command architecture including antiskid brake control, in accordance with various embodiments.

With reference to FIG. 6, a brake pressure command architecture 600 with antiskid control is illustrated, in accordance with various embodiments. In response to the servo valve calibration being successful, the pressure control 502 is bypassed and a current calculated using the calibrated transfer function is sent to a brake control executive 504. The brake control executive 504 may further receive an antiskid current command from an antiskid control 506. The brake control executive 504 may be configured to send the current command having the lowest value current command (chosen from either the current calculated using the calibrated transfer function or the antiskid current command) to the servo valve 42 for applying braking during a braking maneuver of the aircraft. In response to the servo valve calibration being unsuccessful, the pressure control 502 is utilized and outputs the current to the brake control executive 504. Again, the brake control executive 504 may be configured to send the current command having the lowest value current command (chosen from either the pressure control current command or the antiskid current command) to the servo valve 42 for applying braking during a braking maneuver of the aircraft.

Figure 7:
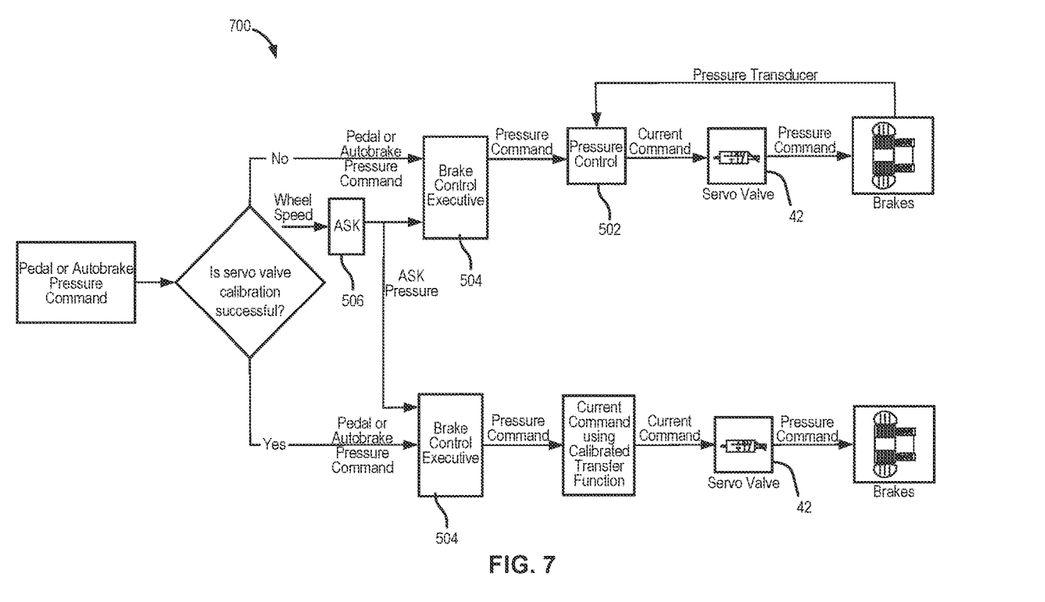
FIG. 7 illustrates a brake pressure command architecture including antiskid brake control, in accordance with various embodiments.

With reference to FIG. 7, a brake pressure command architecture 700 with antiskid control is illustrated, in accordance with various embodiments. Brake pressure command architecture 700 may be similar to architecture 600, except that the pressure control 502 may be moved behind (downstream) from the brake control executive 504. In response to the servo valve calibration being successful, the pressure control 502 is bypassed and a pressure command (e.g., brake pedal command or autobrake command) is sent to a brake control executive 504. The brake control executive 504 may further receive an antiskid pressure command from antiskid control 506. The brake control executive 504 may be configured to output the lowest of these two pressure commands for calculating a current using the calibrated transfer function, which may be then sent to the servo valve 42 for applying braking during a braking maneuver of the aircraft. In response to the servo valve calibration being unsuccessful, the pressure control 502 is utilized and a pressure command (e.g., brake pedal command or autobrake command) is sent to the brake control executive 504. The brake control executive 504 may further receive an antiskid pressure command from antiskid control 506. The brake control executive 504 may be configured to output the lowest of these two pressure commands to the pressure control 502. The pressure control 502 then sends a current command to the servo valve for applying braking during a braking maneuver of the aircraft using pressure transducer feedback signals.

Figure 8:
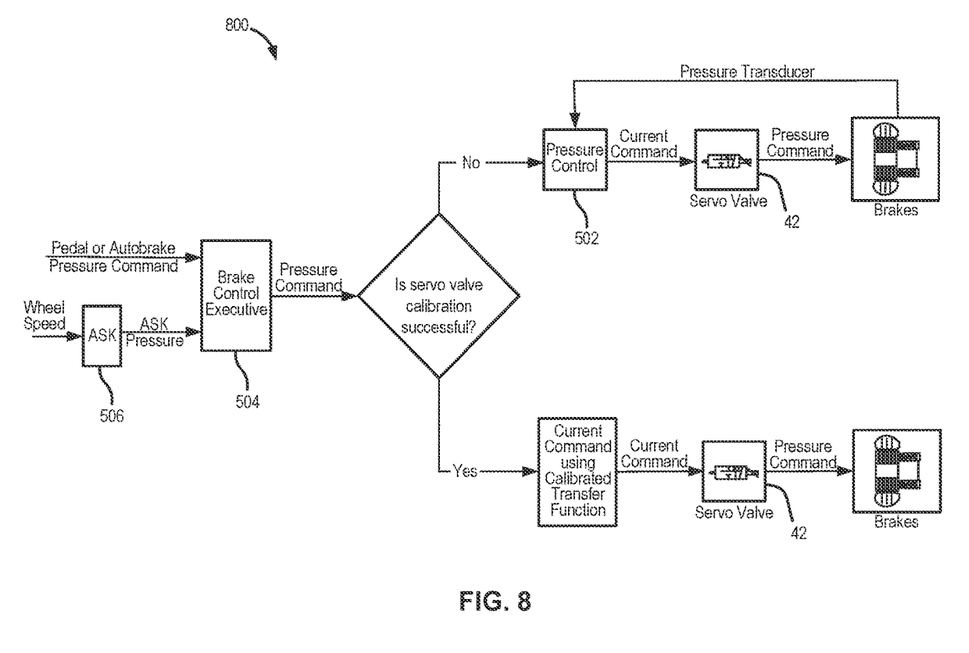
FIG. 8 illustrates a brake pressure command architecture including antiskid brake control, in accordance with various embodiments.

With reference to FIG. 8, a brake pressure command architecture 800 is illustrated, in accordance with various embodiments. Brake pressure command architecture 800 may be similar to architecture 500, except that an antiskid control 506 and brake control executive 504 is added in front (upstream) of the decision block for determining whether the servo valve calibration was successful. Stated differently, the decision block for determining whether the servo valve calibration was successful may receive a pressure command from the brake control executive 504. The brake control executive 504 may receive a pressure command (e.g., brake pedal command or autobrake command)—e.g., from a cockpit of an aircraft. The brake control executive 504 may further receive an antiskid pressure command from antiskid control 506. The brake control executive 504 may be configured to output the lowest of these two pressure commands. In response to the servo valve calibration being successful, the pressure control 502 is bypassed and a current calculated using the pressure command and the calibrated transfer function is used to command the servo valve 42 for applying braking during a braking maneuver of the aircraft in an open-loop fashion. In response to the servo valve calibration being unsuccessful, the pressure control 502 is utilized and outputs the current to the servo valve 42 for applying braking during a braking maneuver of the aircraft in a closed-loop fashion.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system, comprising:
a servo valve configured to receive a hydraulic fluid and provide the hydraulic fluid to apply a braking force to a wheel via a hydraulic line; and
a brake control unit in electronic communication with the servo valve;
wherein the brake control unit is configured to:
determine whether an aircraft is on a ground surface and not moving relative to the ground surface;

determine whether braking is applied to a brake system of the aircraft; and calibrate the servo valve in response to the brake control unit determining that i) the aircraft is on the ground surface, ii) the aircraft is not moving relative to the ground surface, and iii) the braking is not applied to the brake system of the aircraft;

the brake control unit calibrates the servo valve by a method comprising:

sending a first electric current to the servo valve;

in response to the first electric current being sent to the servo valve, determining, with a pressure sensor, a first pressure applied to the brake system via the servo valve;

sending a second electric current to the servo valve; and in response to the second electric current being sent to the servo valve, determining with the pressure sensor a second pressure applied to the brake system via the servo valve.

2. The brake control system of claim 1, wherein the calibrating further comprises calculating, by the brake control unit, a braking pressure versus servo valve current curve based upon the first electric current, the first pressure, the second electric current, and the second pressure.

3. The brake control system of claim 1, wherein the calibrating further comprises calculating, by the brake control unit, a transfer function associated with the servo valve using the first electric current, the first pressure, the second electric current, and the second pressure.

4. The brake control system of claim 1, wherein the second electric current is sent to the servo valve for a predetermined duration, and the second pressure is an average pressure measured during the predetermined duration.

5. The brake control system of claim 1, wherein the brake control unit is further configured to:

determine whether the calibration of the servo valve was successful;

operate as an open-loop system in response to the calibration being successful; and operate as a closed-loop system in response to the calibration being unsuccessful.

6. The brake control system of claim 3, wherein the transfer function is used for calculating an electric current for a desired braking pressure commanded via the servo valve.

7. The brake control system of claim 6, wherein the brake control unit is further configured to operate the servo valve based on the electric current calculated using the transfer function.

8. The brake control system of claim 1, wherein:

the calibrating further comprises calculating, by the brake control unit, a transfer function associated with the servo valve using the first electric current, the first pressure, the second electric current, and the second pressure;

the transfer function is used for calculating an electric current for a desired braking pressure commanded via the servo valve; and the brake control unit is further configured to:

determine whether the calibration of the servo valve was successful;

operate as an open-loop system in response to the calibration being successful, wherein the brake control unit uses the transfer function for calculating a servo valve command current; and operate as a closed-loop system in response to the calibration being unsuccessful.

9. A method for operating a brake control unit, comprising:

initiating, by the brake control unit, a servo valve calibration process;

determining, by the brake control unit, whether an aircraft is on a ground surface and not moving relative to the ground surface;

determining, by the brake control unit, whether braking is applied to a brake system of the aircraft; and calibrating, by the brake control unit, a servo valve in response to the brake control unit determining that the aircraft is on the ground surface and not moving relative to the ground surface, and that braking is not applied to the brake system of the aircraft;

the brake control unit calibrates the servo valve by a method comprising:

sending a first electric current to the servo valve;

in response to the first electric current being sent to the servo valve, determining, with a pressure sensor, a first pressure applied to the brake system via the servo valve;

sending a second electric current to the servo valve; and in response to the second electric current being sent to the servo valve, determining with the pressure sensor a second pressure applied to the brake system via the servo valve.

10. The method of claim 9, wherein the calibrating further comprises calculating, by the brake control unit, a braking pressure versus servo valve current curve based upon the first electric current, the first pressure, the second electric current, and the second pressure.

11. The method of claim 9, wherein the calibrating further comprises calculating, by the brake control unit, a transfer function associated with the servo valve using the first electric current, the first pressure, the second electric current, and the second pressure.

12. The method of claim 9, wherein the second electric current is sent to the servo valve for a predetermined duration, and the second pressure is an average pressure measured during the predetermined duration.

13. The method of claim 9, further comprising:

determining, by the brake control unit, whether the calibration of the servo valve was successful;

commanding, by the brake control unit, braking in an open-loop fashion in response to the calibration being successful; and commanding, by the brake control unit, braking in a closed-loop fashion in response to the calibration being unsuccessful.

* * * * *